United States Patent [19]

Kelly et al.

[11] Patent Number: 5,277,473
[45] Date of Patent: Jan. 11, 1994

[54] INFANT SEAT FOR USE IN SHOPPING CARTS

[75] Inventors: Ray G. Kelly, Kirkwood; Sharon A. Thurnbough, Ellisville; Stephen R. Kovac, St. Louis, all of Mo.

[73] Assignees: Saf-T-Loc, Inc., St. Louis; Angeles Group, Inc., Pacific, both of Mo.

[21] Appl. No.: 958,700

[22] Filed: Oct. 9, 1992

[51] Int. Cl.$^5$ ............................................... A47C 1/10
[52] U.S. Cl. ............................. 297/250.1; 280/33.993
[58] Field of Search .................. 297/250; 280/33.991, 280/33.993

[56] References Cited

U.S. PATENT DOCUMENTS

| | | | |
|---|---|---|---|
| 2,889,151 | 6/1959 | Sides | 280/33.993 |
| 3,351,380 | 11/1967 | Sprague | 280/33.993 |
| 4,108,489 | 8/1978 | Salzman | 280/33.993 |
| 4,598,945 | 7/1986 | Hopkins | 280/33.993 |
| 4,666,207 | 5/1987 | Quartano | 297/250 |
| 4,688,850 | 8/1987 | Brownlie et al. | 297/270 |
| 4,861,105 | 8/1989 | Merten et al. | 297/250 |
| 4,889,388 | 12/1989 | Hime | 297/DIG. 1 |
| 4,958,887 | 9/1990 | Meeker | 297/250 |
| 5,056,865 | 10/1991 | Sedlack | 297/250 |
| 5,106,155 | 4/1992 | Luehring | 297/460 |

Primary Examiner—Peter M. Cuomo
Assistant Examiner—Darnell M. Boucher
Attorney, Agent, or Firm—Polster, Lieder, Woodruff & Lucchesi

[57] ABSTRACT

An infant seat for use in a number of environments including shopping carts, pre-school nurseries, and other uses is disclosed. When used with shopping carts, the infant seat includes a contoured bucket seat which has a substantial portion that is supported within the confines of a shopping cart with an infant positioned to face a user of the shopping cart. The contoured bucket seat is capable of being pivoted substantially outside of the confines of the shopping cart to facilitate nesting of adjacent shopping carts within the respective confines of each other. When used in a pre-school nursery environment, the infant seat is adapted to be mounted on a supporting structure. In other environments, the infant seat may be used by itself. The contoured bucket seat forming the infant seat is integrally formed from a closedcell flex foam material which provides substantial strength and durability while also being soft enough to enable an infant to be comfortably positioned within the contoured bucket seat.

9 Claims, 3 Drawing Sheets

INFANT SEAT FOR USE IN SHOPPING CARTS

BACKGROUND OF THE INVENTION

The present invention relates to an infant seat for use in a variety of environments including shopping carts, pre-school nurseries and other applications. The infant seat is uniquely constructed for use in such environments.

Infant seats are commonly used in shopping carts to enable a shopper to watch the infant while shopping at the same time. Current infant seats are effectively constructed to support and protect the infant, but do not always permit the shopper to look directly at the infant. Some infant seats are mounted transverse to the shopping cart, thus making it difficult for both the infant and the shopper to see each other. Such infant seats have been designed to extend transversely to the shopping cart in order to enable at least some nesting of shopping carts. Where infant seats are constructed to allow the shopper to look directly at the infant, they have created problems in the nesting of adjacent shopping carts. Currently, there is no shopping cart infant seat where the infant is positioned to face the shopper, while also permitting nesting of adjacent shopping carts.

The mounting of the infant seats to shopping carts has also created certain requirements. For example, the rear of the infant seat must be sufficiently strong enough to mount to the shopping cart, while the body contoured section of the infant seat must be sufficiently soft to comfortably support and protect the infant. At present, most infant seats for shopping carts are manufactured in a two part construction, a rigid supporting section and a relatively soft body supporting section which is mounted on the rigid rear supporting section. In addition, such designs require different manufacturing techniques for producing and assembling the rigid rear and body supporting sections which is forming the two part infant seats. At present, there is no one piece contoured bucket seat for infants which is sufficiently rigid and durable while also being sufficiently soft and comfortable to support the infant.

As will be appreciated from the discussion that follows, the infant seat of the present invention is not only usable in shopping carts, but can also be used in pre-school nurseries where a supporting structure is provided for the infant seat and in other environments where the uniquely constructed infant seat of the present invention may be used.

SUMMARY OF THE INVENTION

Among the several objects and advantages of the present invention include:

The provision of a new and improved infant seat for shopping carts, pre-school nurseries and other applications;

The provision of the aforementioned infant seat which, when used with a shopping cart, enables a substantial portion of the infant seat to be supported within the confines of the shopping cart with an infant positioned to face a user while also enabling the infant seat to be pivoted substantially outside of the confines of the shopping cart to facilitate nesting of adjacent shopping carts within the respective confines of each other;

The provision of the aforementioned infant seat which provides a simple and effective supporting means when positioned within the confines of the shopping cart, but enables the infant seat to be quickly and effectively positioned outside of the shopping cart when the rear swinging gate of adjacent shopping carts are moved out of the wall for nesting with respect to one another;

The provision of the aforementioned infant seat which is integrally formed in a one piece construction from closed cell flex foam material to provide a durable and rigid, yet sufficiently soft material for supporting infants;

The provision of the aforementioned infant seat which is simple in construction and operation, is made of a minimum number of parts, is durable and long lasting and is otherwise well adapted for the purposes intended.

Briefly stated, the infant seat of the present invention is constructed for use with shopping carts, in pre-school nurseries and in other environments. When used with shopping carts, the infant seat, formed as a contoured bucket seat, has a substantial portion supported within the confines of the shopping cart with an infant positioned to face a user of the shopping cart, while enabling the contoured bucket seat to be pivoted substantially outside of the confines of the shopping cart to facilitate nesting of adjacent shopping carts within the respective confines of each other.

Means are provided for supporting a substantial portion of the contoured bucket seat within the confines of the shopping cart along with means for pivoting the contoured bucket seats substantially outside of the confines of the shopping cart. The means for supporting the substantial portion of the contoured bucket seat within the confines of a shopping cart includes means for pivoting the contoured bucket seats substantially outside the confines of the shopping cart. More specifically, the means for supporting the substantial portion of the contoured bucket seat within the confines of the shopping cart include spaced supporting bars attached to and underlying the contoured bucket seat, while the means for pivoting the contoured bucket seat substantially outside of the confines of the shopping cart includes outer free ends of the spaced supporting bars which are pivotally mounted to a horizontally extending bar along a rear area of the shopping cart.

The means for supporting the contoured bucket seat also includes means for attaching the contoured bucket seat to a swinging gate at the rear of the shopping cart so as to prevent inadvertent pivoting of the contoured bucket seat until nesting of adjacent shipping carts is desired.

The spaced supporting bars are positioned within lower side portions which extend downwardly along outer peripheral margins of a rear surface of the contoured bucket seat. The spaced supporting bars are integrally connected to one another by spaced connecting bars, while a safety bar extends from one of the space connecting bars and has an outer free end for pivotal attachment to a swinging gate at the rear area of the shopping cart.

The contoured bucket seat is integrally formed from closed cell foam material of predetermined thickness in upper and lower body supporting sections of the contoured bucket seat. The relative predetermined thickness of the lower body supporting section may be substantially greater than the upper body supporting section.

The contoured bucket seat includes integral spaced side portions in the upper body supporting section and integral spaced arm portions in the lower body supporting sections both extending upwardly and substantially normal to the upper and lower body supporting sections along outer peripheral margins of the contoured body seat. The contoured bucket seat also includes lower spaced side portions which extend downwardly and are substantially normal to the contoured rear surface along outer peripheral margins thereof.

These and other objects and advantages of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENT

The following detailed description illustrates the invention by way of example and not by way of limitation. This description will clearly enable one skilled in the art to make and use the invention and describes several embodiments, adaptions, variations, alternatives and uses of the invention, including what we presently believe to be the best mode of carrying out the invention.

Figure 1:
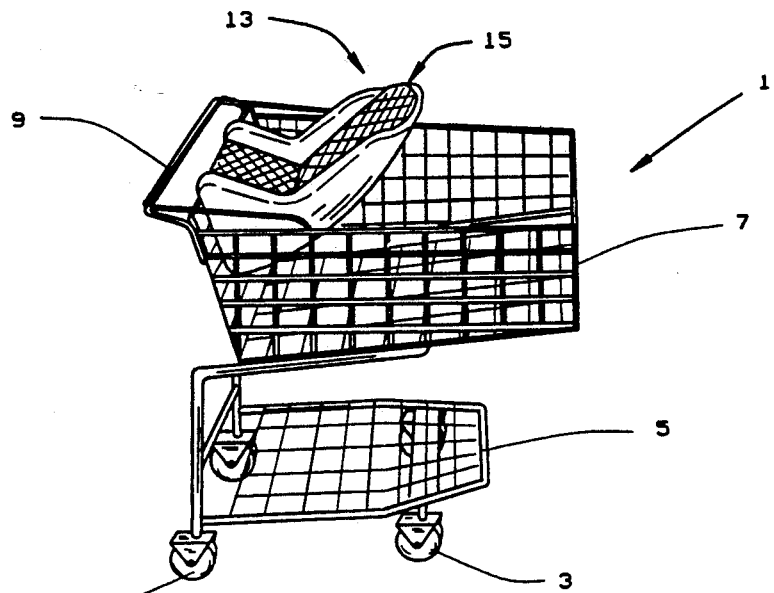
FIG. 1 is a perspective view of a typical shopping cart with the infant seat of the present invention having a substantial portion thereof positioned within the confines of the shopping cart during use.
Figure 2:
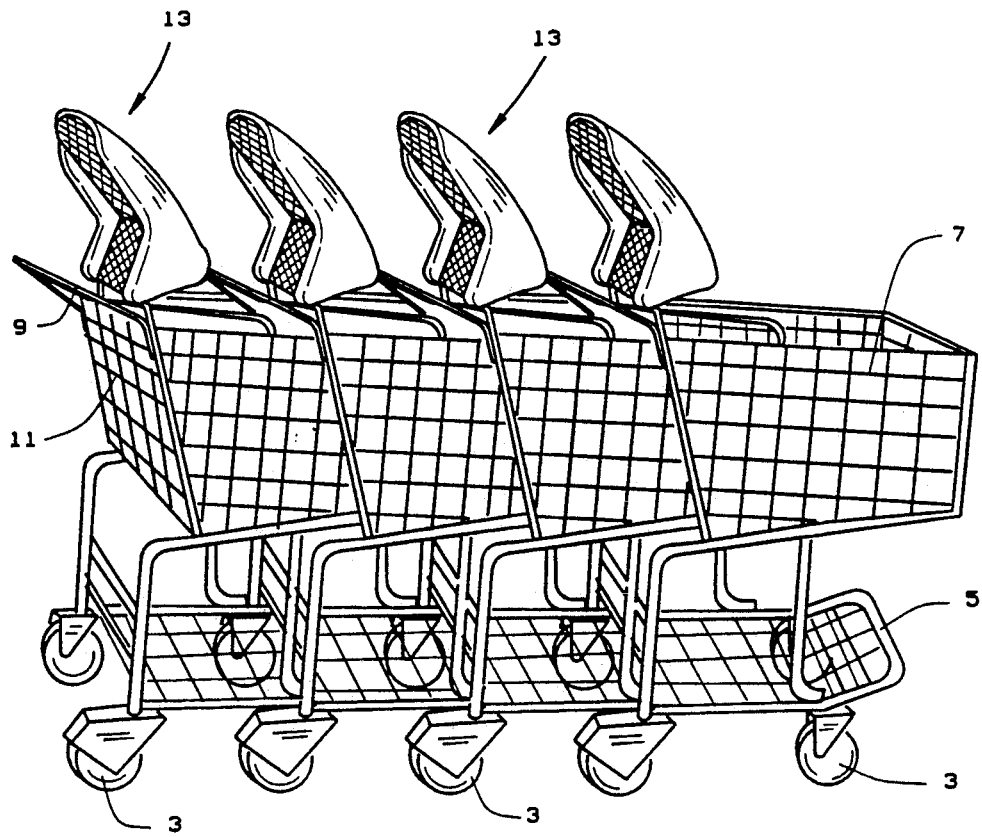
FIG. 2 is a perspective view of a series of nested shopping carts with the infant seat pivoted substantially outside of the confines of the shopping cart to facilitate nesting of the shopping carts within the respective confines of each other.
Figure 3:
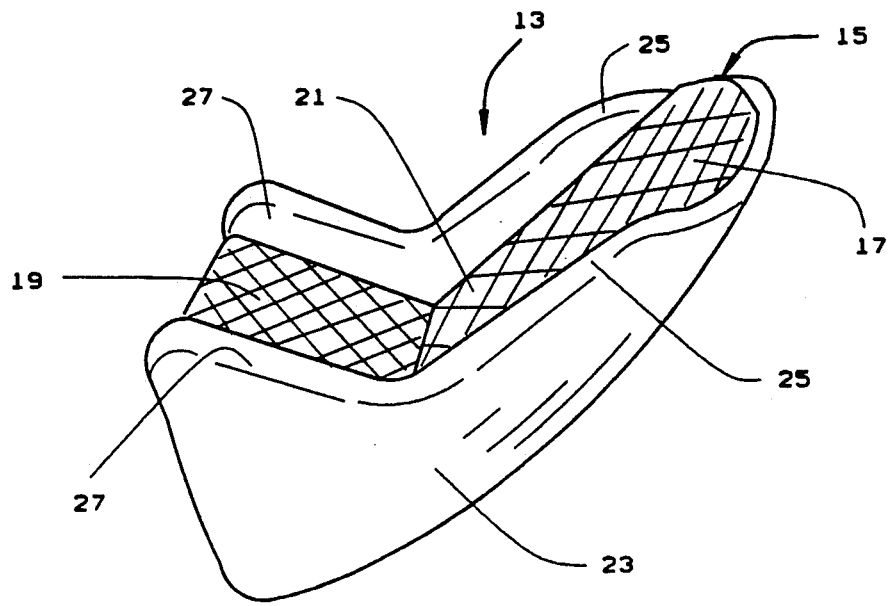
FIG. 3 is an enlarged perspective view of the infant seat constructed in accordance with the principles of the present invention.

The shopping cart 1 illustrated in FIGS. 1-2 of the drawings is of typical open mesh construction having supporting wheels 3 a lower shelf 5, an upper basket 7 and a rear supporting handle 9. As illustrated in FIG. 2 of the drawings, the upper basket 7 includes a rear wall 11 of the swinging gate design, enabling shopping carts to be nested with respect to one another when the front part of the basket 7 engages the rear swinging gate 11 of an adjacent cart, for nesting same, as is well known.

The infant seat of the present invention, generally represented by the numeral 13, is constructed to have a substantial portion supported within the confines of the shopping cart 1 with an infant positioned to face a user of the shopping cart 1, as shown in FIG. 1, while enabling the infant seat 13 to be pivoted substantially outside of the confines of the shopping cart 1 during the nesting of adjacent shopping carts within the respective confines of each other, as shown in FIG. 2.

The construction of the infant seat 13 and the manner in which it is mounted to shopping carts 1 is best illustrated in FIGS. 3-6 of the drawings. The infant seat 13 is formed as a contoured bucket seat 15 as illustrated and is integrally formed from closed cell flex foam material in a one-piece construction. Thus, the entire contoured bucket seat 15 can be injection molded from the closed cell flex foam material into the shape illustrated in FIG. 3 of the drawings. This provides a very strong and durable product that also has sufficient flexibility and resilience to enable an infant to be comfortably supported and protected within the contoured bucket seat 15. At the same time, the closed cell flex foam material is sufficiently rigid for attaching and securing supporting structure in order to mount the seat to a shopping cart or to an independent supporting structure, as desired.

The contoured bucket seat 15 includes an upper supporting section 17 and a lower body supporting section 19. The relative predetermined thickness between a body contoured upper surface 21, shown with a preformed criss cross pattern, and a contoured rear surface 23 is substantially greater in the lower body supporting section 19 than the upper body supporting section 17. The lower body supporting section 19 absorbs much of the weight of the infant, as will become apparent from the manner in which the infant seat 13 is mounted to the shopping cart 1.

The contoured bucket seat 15 further includes integral spaced side portions 25, 25 in the upper body supporting section 17 and integral spaced arm portions 27, 27 in the lower body supporting section 19, both extending upwardly and substantially normal to the body contoured upper surface 21 along outer peripheral margins of the contoured bucket seat 15. As will be apparent, the integral spaced side portions 25, 25 and the integral spaced arm portions 27, 27 keep the infant from rolling out of the contoured bucket seat. The contoured bucket seat 15 also includes lower spaced side portions 29, 29 which extend downwardly and are substantially normal to the contoured rear surface 23 along outer peripheral margins in the lower body supporting section 19, as shown in FIG. 4.

Figure 4:
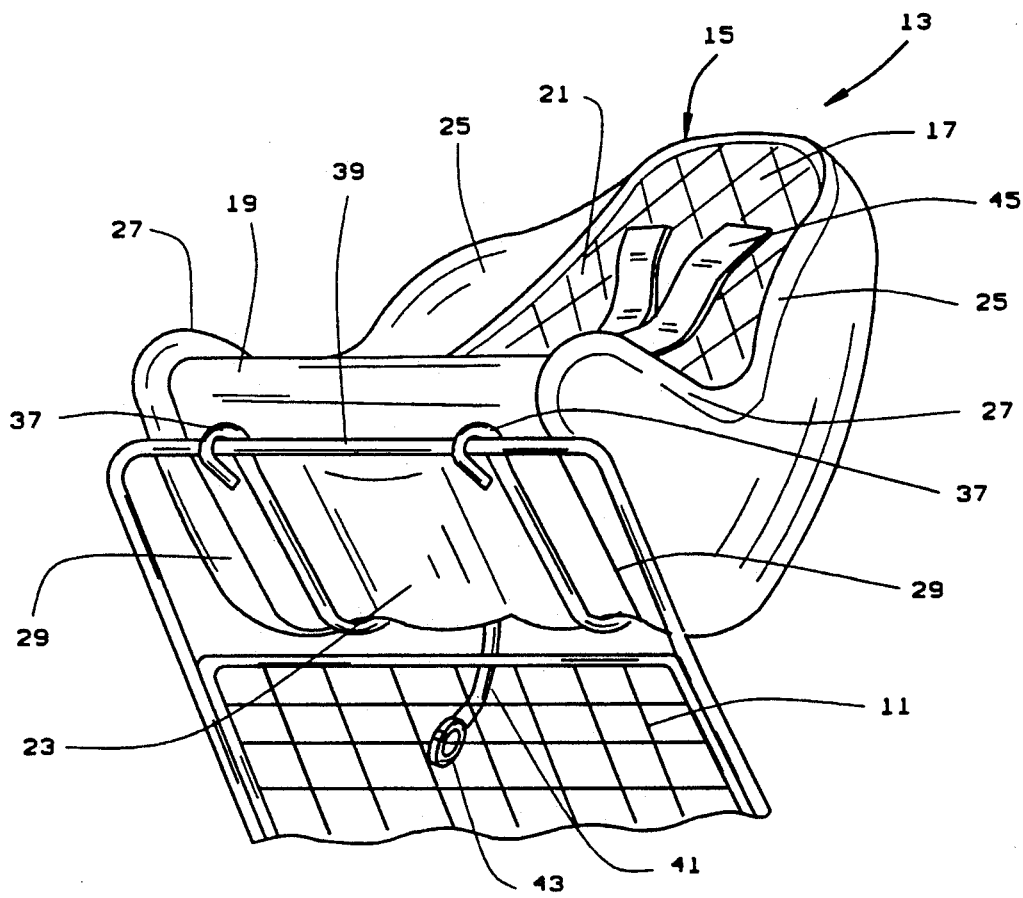
FIG. 4 is a perspective view, partially in section, of the infant seat of the present invention shown as being mounted to the specific sections of the shopping cart.
Figure 5:
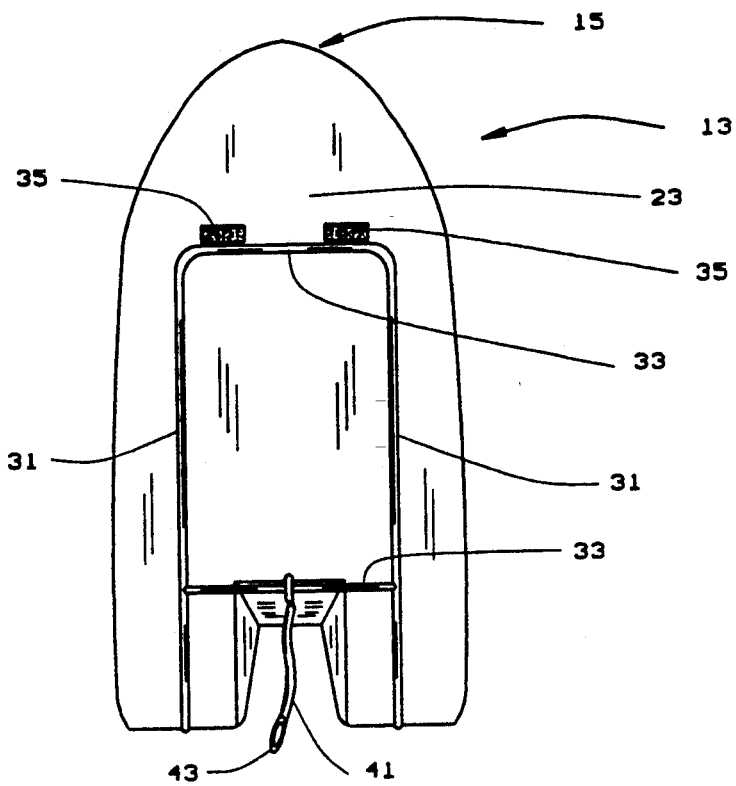
FIG. 5 is a rear elevational view of the infant seat of the present invention.
Figure 6:
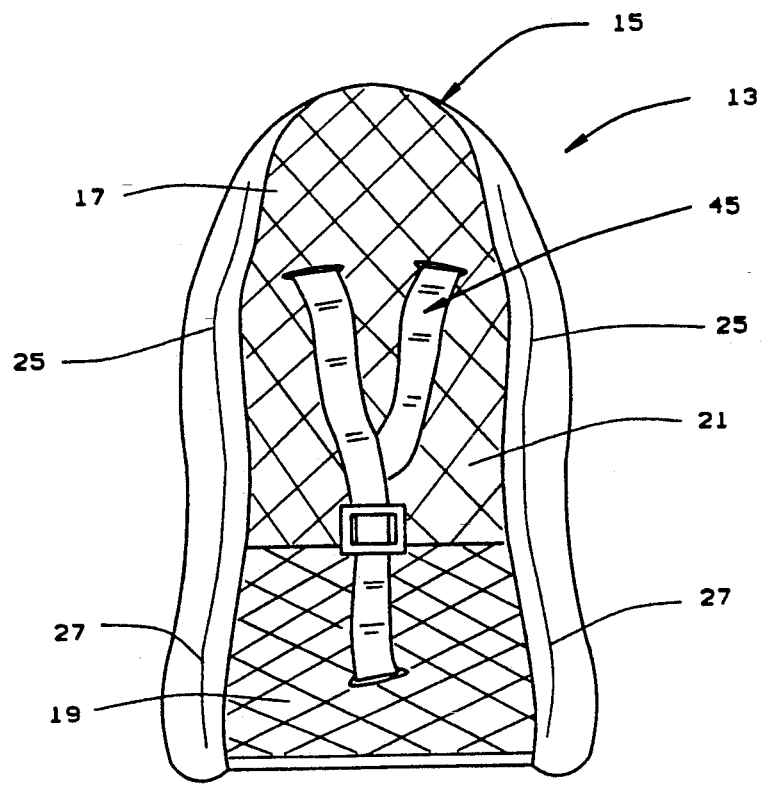
FIG. 6 is a front elevational view of the infant seat of the present invention.

For mounting the contoured bucket seat 15 to the shopping cart 1, spaced supporting bars 31, 31 are attached to and underlie the contoured bucket seat 15, as best seen in FIGS. 4-5 of the drawings. The spaced supporting bars 31, 31 are integrally connected to one another by spaced connecting bars 33, 33 on the rear contoured surface 23 of the contoured bucket seat 15. The upper connecting bar 33 is secured to the contoured bucket seat 15 through the fastening elements 35, 35. Such fastening elements 35, 35 are either separate or integral elements which mount directly to the contoured bucket seat 15 to trap and secure the upper connecting bar 33 to the contoured bucket seat 15.

Preferably, the rear contoured surface 23 of the contoured bucket seat 15 is suitably configured with complementary indentations or grooves to receive the supporting bars 31, 31 and connecting bars 33, 33. This prevents the supporting and connecting bars from shifting out of position, while providing a structurally integrated support to the contoured bucket seat 15.

For supporting the contoured bucket seat 15 to a shopping cart 1, it will be noted that the spaced supporting bars 31, 31 extend around the rear contoured surface 23 in both the upper and lower body supporting sections 17, 19 and terminate in reversely bent loops 37, 37 at the outer free ends thereof which are secured to the fixed upper supporting bar 39 from which the swinging gate 12 is mounted. This is best illustrated in FIG. 4 of the drawings where the reversely bent ends 37, 37 are shown as securely mounting the contoured bucket seat 15 to the fixed upper supporting bar 39, while the spaced supporting bars 31, 31 underlie the upper and lower body supporting sections 17, 19 of the contoured bucket seat 15. This provides a simple, yet effective mounting and support of the contoured bucket seat 15 in the upper basket 7 of the shopping cart 1, as illustrated in FIG. 1 of the drawings.

The contoured bucket seat 15 is thus pivotally mounted to the fixed upper supporting bar 39, in order to enable the contoured bucket seat 15 to be moved from a position within to a position outside of the confines of the upper basket 7 of the shopping cart 1.

In order to prevent random and inadvertent pivoting movement of the contoured bucket seat 15, until shopping carts are nested together, a safety bar 41 extends from the lower connecting bar 33 on the rear of the contoured bucket seat 15 (FIG. 5) and has a reversely bent outer free end 43 that is wrapped around one of the wire bars forming the fence 11. Thus, when an infant is positioned in the contoured bucket seat 15, it is impossible to inadvertently dislodge or move the contoured bucket seat 15. However, when the swinging gate 11 is moved upwardly by an adjacent nested shopping cart, the safety bar 41 no longer restrains the contoured bucket seat 15 in the position illustrated in FIG. 1 of the drawings As a result, the contoured bucket seat 15 may then be pivoted to the position illustrated in FIG. 2 by the reversely bent outer free ends 37 of the spaced bars 31 moving about the fixed upper bar 39. This occurs automatically as shopping carts are nested one within the other. Similarly, when a shopping cart with the infant seat 13 is removed from a nested position, the contoured bucket seat 15 is automatically re-positioned within the confines of the upper basket 7, as illustrated in FIG. 1 of the drawings.

In addition to being used in shopping carts, the one-piece contoured bucket seat 15 formed of closed cell flex foam material, may also be used in other infant seat applications, where strength and durability, yet comfort and protection are desired in a one-piece construction From the foregoing, it will now be appreciated that while the primary embodiment disclosed is for a shopping cart application, pre-school nursery and other infant seat applications are also contemplated. It will thus be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

We claim:
1. An infant seat for shopping carts comprising:
a contoured bucket seat;
means for supporting a substantial portion of the contoured bucket seat within the confines of a shopping cart with an infant positioned to face a user of the shopping cart;
means for pivoting the contoured bucket seat substantially outside the confines of the shopping cart to facilitate nesting of adjacent shopping carts within the respective confines of each other;
the means for supporting a substantial portion of the contoured bucket seat within the confines of the shopping cart includes means for pivoting the contoured bucket seat substantially outside the confines of the shopping cart;
said means for supporting the bucket seat includes spaced supporting bars attached to and underlying the contoured bucket seat;
the means for pivoting the contoured bucket seat includes outer free ends of the spaced supporting bars which are pivotally mounted to a horizontally extending bar along a rear area of the shopping cart, means for supporting the contoured bucket seat includes means for attaching the contoured bucket seat to a swinging gate at the rear of the shopping cart so as to prevent inadvertent pivoting of the contoured bucket seat until nesting of adjacent shopping carts through the rear swinging gate of adjacent carts;
the spaced supporting bars are positioned within lower side portions which extend downwardly along outer peripheral margins of a rear surface of the contoured bucket seat; and
the spaced supporting bars are integrally connected to one another by spaced connecting bars, and a safety bar extends from one of the spaced connecting bars and has an outer free end for pivotal attachment to a swinging gate at the rear area of the shopping cart.

2. The infant seat as defined in claim 1 wherein the contoured bucket seat includes a body contour upper surface with a contoured rear surface conforming in shape to the body contoured upper surface;
the infant seat being mounted in a shopping cart with an infant positioned to face the user of the cart when received within the body contoured upper surface of the contoured bucket seat;
said spaced supporting bars attached to an underlying the contoured rear surface of the contoured bucket seat, the spaced supporting bars having outer free ends which are pivotally mounted to a horizontally extending bar along a rear area of the shopping cart;
whereby the contoured bucket seat for infants can be moved to a position where a substantial portion thereof is within the confines of the shopping cart during use or pivoted up and substantially out of the confines of the shopping cart during non-use to facilitate nesting of adjacent shopping carts within the respective confines of one another.

3. The infant seat as defined in claim 1 wherein the contoured bucket seat is integrally formed from closed cell flex foam material.

4. The infant seat as defined in claim 1 wherein the contoured bucket seat is integrally formed from closed cell foam material of predetermined thickness in upper and lower body supporting sections of the contoured bucket seat.

5. The infant seat as defined in claim 4 wherein the relative predetermined thickness of the lower body supporting section is substantially greater than the upper body supporting section.

6. The infant seat as defined in claim 5 wherein the contoured bucket seat includes integral spaced side portions in the upper body supporting section and integral spaced arm portions in the lower body supporting section both extending upwardly and substantially normal to the upper and lower body supporting sections along outer peripheral margins of the contoured body seat.

7. The infant seat as defined in claim 3 wherein the body contoured bucket seat includes an upper body supporting section and a lower body supporting section, the relative predetermined thickness between the body contoured upper surface and the contoured rear surface in the lower body supporting section being substantially greater than in the upper body supporting section.

8. The infant seat as defined in claim 3 wherein the contoured bucket seat further includes integral spaced side portions in the upper body supporting section and integral spaced arm portions in the lower body supporting section both extending upwardly and substantially normal to the body contoured upper surface along outer peripheral margins of the contoured bucket seat.

9. The infant seat as defined in claim 7 wherein the contoured bucket seat also includes lower spaced side portions which extend downwardly and substantially normal to the contoured rear surface along outer peripheral margins thereof.

* * * * *

UNITED STATES PATENT AND TRADEMARK OFFICE
CERTIFICATE OF CORRECTION

PATENT NO. :  5,277,473
DATED      :  January 11, 1994
INVENTOR(S) :  Ray G. Kelly, et al It is certified that error appears in the above-indentified patent and that said Letters Patent is hereby corrected as shown below:

Column 6, Line 29, delete "contour" and insert -- contoured --
Column 6, Line 36, delete "an" and insert -- and --

Signed and Sealed this

Twenty-second Day of November, 1994

Attest:

BRUCE LEHMAN

*Attesting Officer*    *Commissioner of Patents and Trademarks*